Sept. 29, 1942. E. E. VAN CLEAVE Re. 22,190

RAILWAY HAND BRAKE MECHANISM

Original Filed March 16, 1938 3 Sheets-Sheet 1

Inventor:
Edwin E. Van Cleave,

Witness:
H. I. Sekel

By Kummler Kummler & Woodworth,
Attorneys.

Sept. 29, 1942. E. E. VAN CLEAVE Re. 22,190
RAILWAY HAND BRAKE MECHANISM
Original Filed March 16, 1938 3 Sheets-Sheet 2
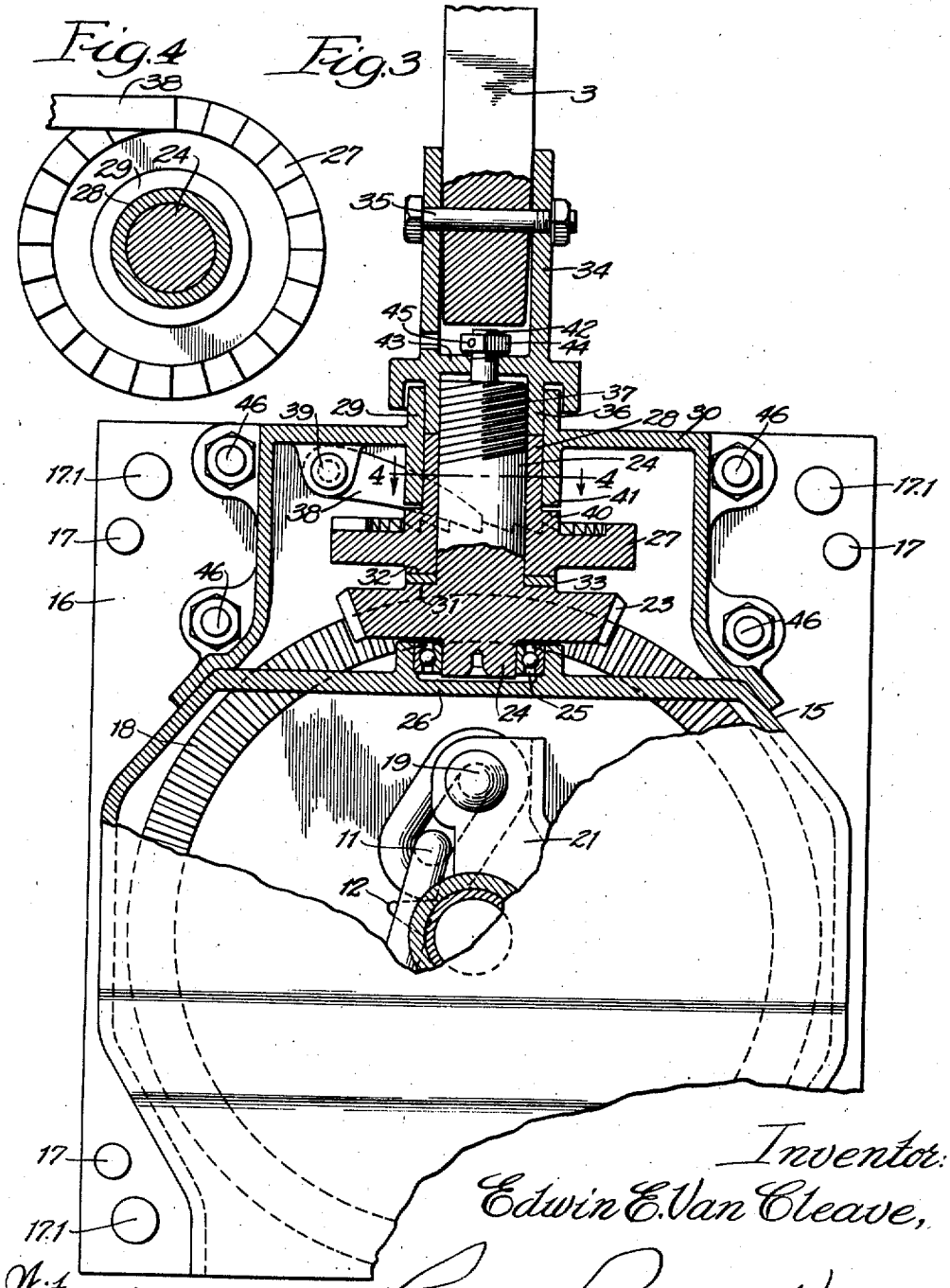
Inventor:
Edwin E. Van Cleave,
by Kummler Kummler & Woodworth,
Attorneys.
Witness:
H. I. Sekut.

Sept. 29, 1942. E. E. VAN CLEAVE Re. 22,190

RAILWAY HAND BRAKE MECHANISM

Original Filed March 16, 1938 3 Sheets-Sheet 3

Inventor:
Edwin E. Van Cleave,

Witness:
L. I. Sekel by Kummler Kummler & Woodworth,
Attorneys.

Reissued Sept. 29, 1942

Re. 22,190

UNITED STATES PATENT OFFICE 22,190

RAILWAY HAND BRAKE MECHANISM

Edwin E. Van Cleave, Chicago, Ill.

Original No. 2,201,656, dated May 21, 1940, Serial No. 196,098, March 16, 1938. Application for reissue April 11, 1941, Serial No. 388,150

15 Claims. (Cl. 74—505)

This invention relates to railway handwheel brakes and particularly to the application to brakes of the horizontal wheel type of safety features shown and described with reference to the vertical wheel type in my copending applications Serial No. 147,827, filed June 12, 1937, and Serial No. 148,520, filed June 16, 1937.

For a great number of years a majority of hand brakes were of the horizontal wheel type with a long vertical shaft which usually was very inefficient since a slight bulge or distortion in the car end might render the brake inoperative.

In recent years the horizontal wheel type has been largely supplanted by the vertical wheel because of its advantages in power and in certain safety features. These old horizontal wheel brakes require the use of two hands to operate and in addition an auxiliary means for holding and releasing the power.

The object of this invention is to provide a horizontal wheel brake with ultra safety features in that the brake is controlled entirely with the handwheel. The operator always has both hands on the wheel and thus is in a secure position on the car. There is no danger of being thrown off the car because of back spin when releasing the load as it only is released by and in proportion to the reverse movement of the handwheel and entirely at the will of the operator.

Further objects of this invention are to provide an improved form of unitary operating mechanism applicable to railway cars, wherein it is desired to have the handwheel mounted on a vertical shaft extending above the roof of the car in convenient position to be operated by a man standing on the brake platform of the car; to provide a mechanism of this kind equipped with safety devices that will preclude any injury to the operator by forceful spinning of the handwheel; to provide an improved mechanism of this kind which can be readily taken apart for inspection of all of its parts with a minimum of operations, and with a minimum of disturbance of the operative relationship of such parts; and to provide an improved form of operating mechanism which is self-locking to the extent of enabling the safe regulation of the speed of brake release under the control of the handwheel without danger to the operator.

Two specific embodiments of this invention are illustrated in the accompanying drawings, in which:

Fig. 3 is a front elevation of the same partly broken away and with some of the parts in section on the line 3—3 of Fig. 2.

Fig. 4 is a sectional detail on the line 4—4 of Fig. 3.

Figure 2:
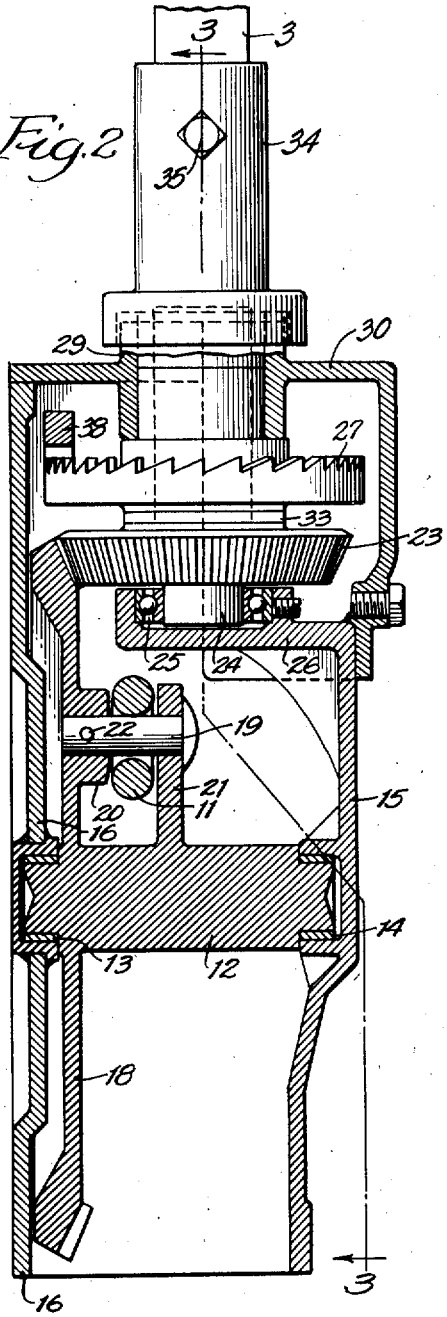
Fig. 2 is a vertical section of the winding drum and its operating mechanism taken on the line 2—2 of Fig. 1.
Figure 1:
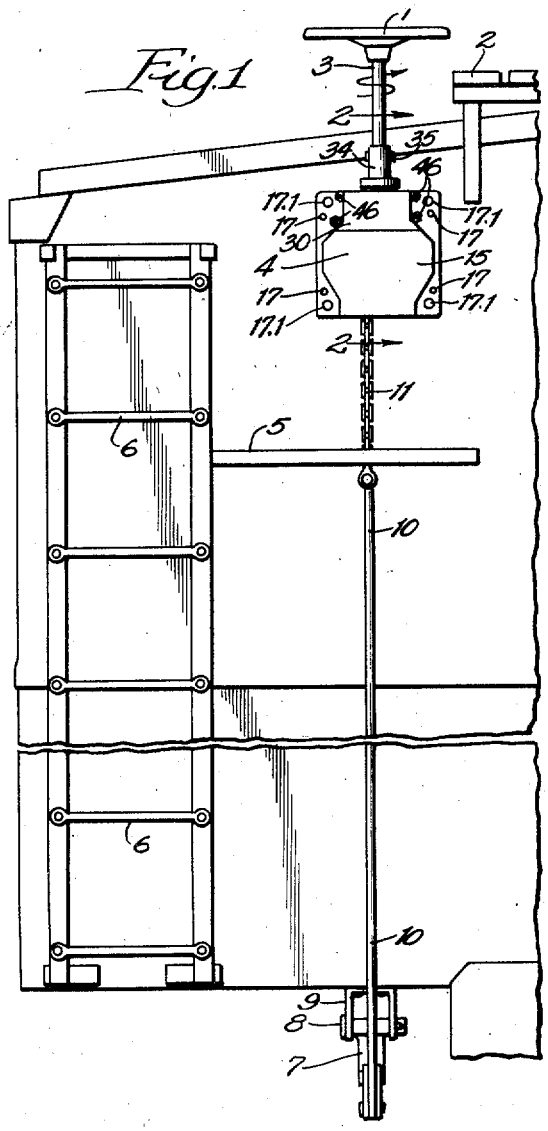
Figure 1 is a fragmentary end elevation of a railway box car equipped with the improved brake mechanism.

The device shown in the drawings is designed for application to a railway car in the position shown in Fig. 1 where the handwheel 1 is shown in its conventional relation to the running board 2 above the roof of the car with a vertical shaft 3 extending upwardly from the winding unit 4. This winding unit is fast to the end wall of the car above a shelf 5 upon which the operator may stand and which is conveniently located with respect to the ladder 6.

The brake rigging may be of any usual form and is connected by a chain to a bell crank 7 pivoted at 8 in a bracket 9 attached to the end sill of the car body. One arm of the bell crank 7 is connected by a link 10 and chain 11 to a winding drum 12 journaled in bearings 13 and 14 on a horizontal axis in the body portion of the housing comprising front and back members 15 and 16, respectively, secured together by the bolts 17 and fastened as a unit to the car wall by bolts 17.1.

A large bevel gear 18 is fast on and preferably integral with the winding drum 12, and the upper end link of the chain 11 is attached to the drum by means of the pin 19 extending between a boss 20 on the gear and arm 21 on the drum. The pin 19 is held in place by a cotter 22.

The operating mechanism for rotating the gear 18 comprises a pinion 23 appropriately beveled and cut to mesh with the teeth on the gear 18 and fast on a stud shaft 24. The lower end of the stud shaft 24 is journaled in a ball bearing 25 mounted in a bracket shelf 26 which is preferably integral with the front member 15 of the housing and extends rearwardly but is spaced from the rear wall to permit the gear 18 to extend upwardly therebetween.

The stud shaft 24 has loosely mounted thereon, above the pinion 23, a one-way holding device comprising a ratchet wheel 27 which, in the form shown, has an integral sleeve or hub 28 within which the stud shaft 24 is journaled and which in turn is journaled in a collar or flange 29 formed on a removable cover member or cap 30 resting on the shelf 26. The latter forms part of the housing and cooperates with the housing member 15 to protect the mechanism from the weather. The opinion 23 and ratchet wheel 27 are provided with opposed clutch faces 31 and 32 between which is mounted a friction disk 33.

The brake wheel shaft 3 is preferably square in section and is provided with an extension member 34 which is socketed in its upper portion to receive the shaft 3, the two being secured together by means of a bolt 35. The lower part of the extension 34 is in the form of a sleeve or hub 36 which is internally threaded to mesh with the threaded end portion 37 of the stud shaft 24. These threads are heavy and of comparatively long pitch, cut right-handed so that clockwise rotation of the handwheel will pull the sleeve 36 downwardly along the stud shaft and through endwise abutment with the sleeve 28, on the ratchet wheel, force the ratchet wheel toward the pinion to cause the friction clutch to engage and lock the ratchet wheel to the pinion. The ratchet wheel cooperates with a pawl 38 pivoted on the cover member 30 at 39 so that the ratchet wheel may turn only in a clockwise direction.

Reverse rotation of the handwheel, that is to say rotation in a counterclockwise direction, will cause the sleeve 36 to travel upwardly on the stud shaft, due to the threaded or spiral connection between the two, and reduce the clutching pressure until the ratchet wheel is completely freed from its clutching connection with the pinion when the shoulder 40 on the ratchet wheel engages the shoulder 41 on the collar 29. The upper end of the stud shaft 24 is provided with a reduced portion 42 which extends through a web or transverse wall 43 and is fitted with a stop comprising a nut 44 locked by a pin 45 which limits the upward movement of the sleeve 36 with respect to the stud shaft 24. When the web 43 is so clamped against the nut 44, the shaft 24 and shaft 3 are locked together so that continued counterclockwise rotation of the handwheel will forcibly rotate the pinion 23 in a direction to disengage the brake.

To protect the mechanism from the weather the extension 34 is provided with a downwardly turned collar radially spaced from the hub 36. Thus a downwardly opening annular groove is provided between this collar and the hub 36 in which the flange 29 is located, the collar telescoping over the flange 29.

The housing cap 30 is mounted on the front housing member 15 by stud bolts 46, extending through appropriately located ears and bosses on those parts, in such manner that all of the operating mechanism from the pinion 23 upward can be lifted out of the housing as a unit with the cover plate 30, thus enabling all of the parts thereof to be inspected with a minimum of dismantling of the structure. The winding mechanism is readily removable by removing the front wall 15 of the housing.

Figure 5:
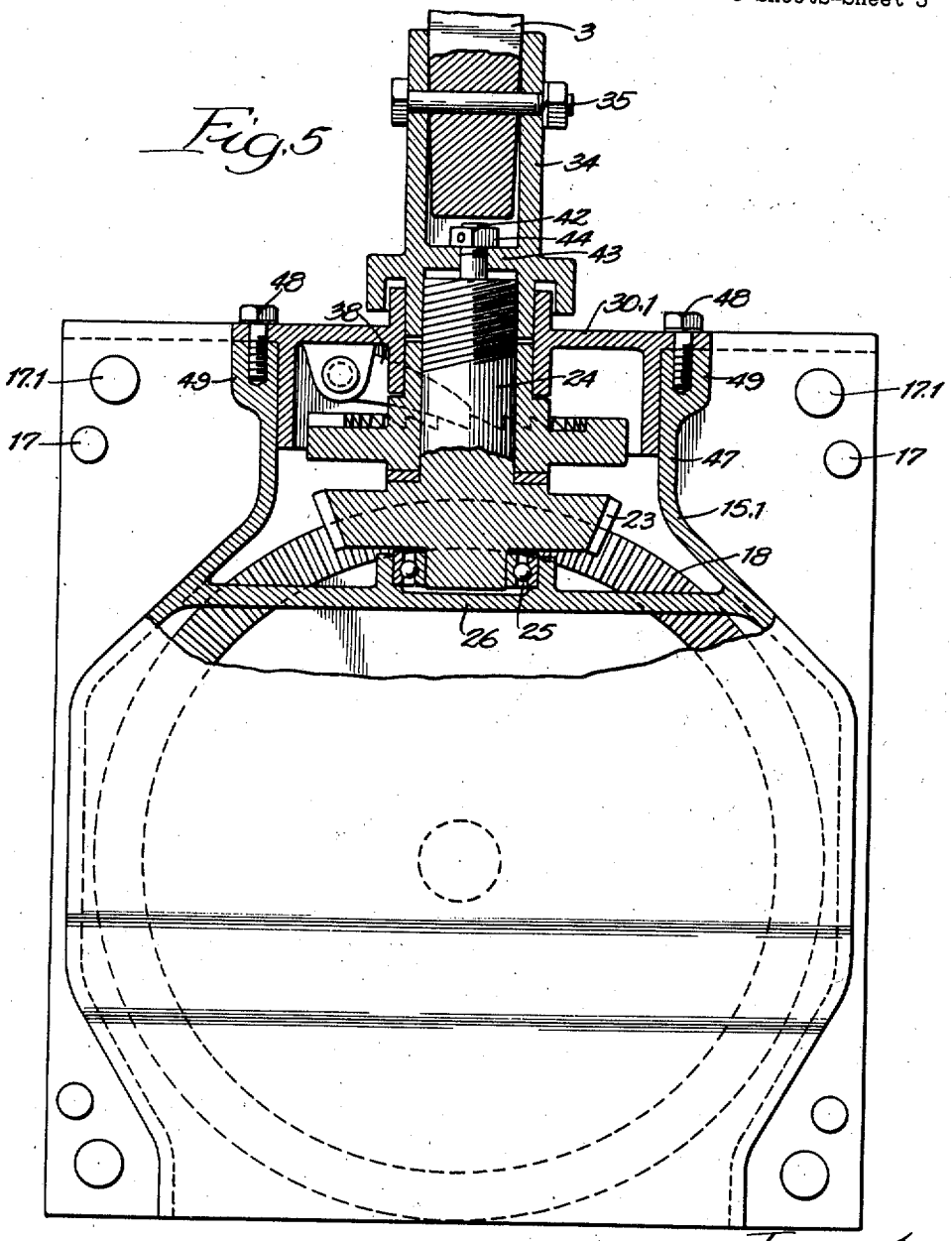
Fig. 5 is a section corresponding to Fig. 3 but with a modified form of housing.

In the form shown in Fig. 5, the mechanical arrangements are the same but the cover plate 30.1 is formed so as to telescope with a cylindrical portion 47 at the upper end of the housing member 15.1 so that the pinion and its associate mechanism can be withdrawn directly upwardly. In this form the cover plate is fastened by stud bolts 48 which screw into lugs 49.

The operation of the device shown is as follows:

When the brake wheel is turned in clockwise rotation, the sleeve 36 is drawn down by its spiral connection with the stud shaft 24 to force the ratchet wheel 27 into firm clutching engagement with the pinion 23. With the application of sufficient force to the handwheel, the pinion and ratchet will rotate and turn the drum so as to wind up the chain 11 and apply the brakes. The pawl 38 allows the ratchet wheel 27 to turn only in a clockwise direction. When the handwheel is turned in a counterclockwise direction, the clutching engagement between the ratchet wheel 27 and pinion 23 will be gradually released and the pinion 23 will turn at whatever speed is permitted by the counterclockwise rotation of the handwheel.

Any resistance applied to the rotation of the handwheel will cause the spiral connection or thread 37 to draw down the sleeve 36 and stop further rotation. If the operator rotates the handwheel counterclockwise with sufficient speed, he can remove all resistance to rotation of the pinion 23. Thus the release of the brakes is at all times under the control of the operator without any possibility of its transmitting to the handwheel a spinning movement that might result in injury to the operator.

I claim as my invention:

1. In a railway hand brake, a vertical shaft for a handwheel, a winding drum and gear, and an operating mechanism for said gear, comprising an extension coupled to said shaft, a pinion, a stud shaft having driving relation to said pinion, a ratchet loose on said stud shaft, and a friction clutch connection between said ratchet and pinion, said extension and stud shaft having intermeshing helical surfaces for engaging and disengaging said clutch connection through relative rotation of said extension and stud shaft.

2. In a railway hand brake, a vertical shaft for a handwheel, a winding drum and gear, and an operating mechanism for said gear, comprising an extension coupled to said shaft, a pinion, a stud shaft having driving relation to said pinion, a ratchet loose on said stud shaft, and a friction clutch connection between said ratchet and pinion, said extension and stud shaft having intermeshing helical surfaces for engaging and disengaging said clutch connection through relative rotation of said extension and stud shaft, and a housing having a removable member carrying said operating mechanism as a unitary structure.

3. In an apparatus for manually operating railway car brakes the combination of a horizontal handwheel on a vertical shaft, a stud shaft in alinement with said handwheel shaft and having a brake operating pinion thereon, an extension on the handwheel shaft forming a coupling with the stud shaft, a ratchet loose on the stud shaft, a pawl engaging the ratchet, a friction clutch for connecting and disconnecting the ratchet with the stud shaft, and means for causing the clutch to become effective or ineffective dependent upon direction of rotation of said stud shaft.

4. A railway car hand brake comprising, in combination, a housing winding mechanism within the housing, a pinion mounted on a vertical axis for operating said mechanism, a vertical stud shaft for rotating said pinion, a one-way holding device constructed for clutching engagement with said pinion, an extension for said shaft having threaded engagement therewith and adapted on rotation relative to said shaft to effect clutching and unclutching of said device and said pinion, said extension projecting upwardly from said housing, a flange on said housing in which said extension is journaled, and a collar on said extension in telescoping relation over said flange.

5. A railway car hand brake comprising, in combination, a housing, winding mechanism mounted within the housing on a horizontal axis, and operating mechanism within the housing for operating the winding mechanism and mounted on a vertical axis, said operating mechanism including a pinion, a one-way holding device, a manually operable member extending vertically from the housing, and shaft means connecting said pinion and said member and including a threaded connection to permit limited relative rotation betwen said member and said pinion to clutch and unclutch the pinion and device, said housing including a flange extending upwardly therefrom and in which said operating mechanism is journaled, and said member having a collar telescoping over said flange.

6. A railway car hand brake comprising, in combination, a housing, winding mechanism mounted within the housing on a horizontal axis, and operating mechanism within the housing for operating the winding mechanism and mounted on a vertical axis, said housing including a flanged aperture in which said operating mechanism is journaled, said operating mechanism including a manually operable member extending upwardly from the housing, a pinion within the housing, shaft means connecting said member and said pinion, a ratchet mounted on said shaft means above said pinion, said shaft means including a threaded connection to permit limited relative rotation between said member and said pinion to clutch and unclutch the pinion and ratchet, and a pawl supported by the top of the housing and engaging teeth on the upper face of the ratchet.

7. A railway car hand brake comprising, in combination, a housing, winding mechanism mounted within said housing on a horizontal axis, operating mechanism mounted within said housing on a vertical axis and including a manually operable member extending upwardly from the top wall of the housing, and a horizontal shelf within said housing vertically supporting said operating mechanism, the top wall being readily removable and carrying the operating mechanism for removal as a unit therewith.

8. A railway car hand brake comprising, in combination, a housing, winding mechanism mounted within the housing and including a bevel gear mounted on a horizontal axis, operating mechanism mounted in said housing on a vertical axis and including a bevel pinion meshing with said gear at its uppermost portion, said operating mechanism being journaled in the top wall of the housing, and a horizontal shelf located within the housing and having a bearing vertically supporting the operating mechanism at its lower end, the top wall of the housing being removable and the operating mechanism as a unit being removable therewith.

9. A railway car hand brake comprising, in combination, a housing comprising front and rear connected walls and a shelf extending rearwardly from the top edge of the front wall but spaced from the rear wall, winding mechanism mounted in said housing on a horizontal axis and including a bevel gear extending upwardly through the space between the shelf and the rear wall, a cover supported on said shelf, and operating mechanism for actuating said gear carried by said cover and removable as a unit therewith, said operating mechanism being vertically supported by the shelf.

10. A railway car hand brake comprising, in combination, a housing having an open top and a shelf therein spaced below the top, winding mechanism mounted in said housing on a horizontal axis and including a part extending above said shelf, operating mechanism for said winding mechanism vertically supported by said shelf and operatively connected with said part, and a cover for closing said open top and carrying said operating mechanism whereby the cover and operating mechanism are removable as a unit.

11. A railway car hand brake comprising, in combination, a housing having a wall provided with a flanged aperture, winding mechanism within said housing, operating mechanism for the winding mechanism including a shaft having a pinion on one end and extending through said flanged aperture, a ratchet mounted on said shaft adjacent said pinion and having a hub journaled in the flange of said aperture, and a manually operable member having a hub journaled in said flange and having a threaded connection with the other end of said shaft to provide for limited rotation relative thereto to move the hub of said member into endwise abutment with the hub of said ratchet to clutch and unclutch the ratchet and pinion.

12. A railway car hand brake comprising, in combination, winding mechanism, and operating mechanism comprising a shaft, a pinion for operating the winding mechanism fast on the one end of said shaft, a ratchet loose on said shaft adjacent said pinion and adapted to be clamped in clutching engagement with said pinion, said ratchet having a cylindrical hub extending along the shaft, a manually operable member having a cylindrical hub threaded onto the other end of the shaft and adapted to abut endwise against the ratchet hub to clamp the ratchet against the pinion, and housing means having a bore in which both of said hubs are journaled.

13. A railway car hand brake comprising, in combination, a housing having a top wall provided with an aperture having an upwardly extending marginal flange, winding mechanism mounted on a horizontal axis within the housing, and operating mechanism mounted on a vertical axis within the housing and extending upwardly through said aperture, said operating mechanism including a manually operable member having a cylindrical hub journaled in said flange, said member also having a collar radially spaced from said hub to provide a downwardly opening annular groove in which said flange is located.

14. A railway car hand brake comprising, in combination, winding mechanism mounted on a horizontal axis, and operating mechanism mounted on a vertical axis, said operating mechanism including a vertical shaft, a pinion fast on the lower end of said shaft, a ratchet loose on said shaft and located above said pinion, an extension having a hub threaded on the upper end of the shaft and adapted when turned downwardly on the shaft to clamp the ratchet and pinion together, said extension having an upwardly facing socket, and said shaft having a reduced portion extending into said socket, a stop located within said socket and secured to said reduced portion to limit the upward movement of the extension on said shaft, and a manually operable shaft secured in said socket.

15. A railway car hand brake comprising, in combination, winding mechanism adapted to be rotated in one direction for applying the brake and mounted on a horizontal axis, and operating mechanism for rotating said winding mechanism, said operating mechanism comprising a vertical shaft, a pinion fast on the shaft, a ratchet loose on the shaft and adapted to be clamped to the pinion, an extension threaded on said shaft and adapted when turned downwardly on the shaft to clamp the ratchet to the pinion and by continued turning in the same direction to rotate the pinion, the shaft and the ratchet as a unit to apply the brake, said extension being provided with a socket separated from the shaft by a transverse wall, a reduced portion on the shaft extending through said wall and into said socket, and a stop secured to said reduced portion within said socket, said extension being adapted when turned upwardly on the shaft to unclamp the ratchet from the pinion and by continued turning in the same direction to clamp said wall to said stop and thereby rotate the shaft and pinion free of said ratchet to release the brake.

EDWIN E. VAN CLEAVE.